United States Patent
Sabato

(10) Patent No.: US 11,086,339 B2
(45) Date of Patent: Aug. 10, 2021

(54) AUTOMATIC CAMERA DRIVEN AIRCRAFT CONTROL FOR RADAR ACTIVATION

(71) Applicant: ISRAEL AEROSPACE INDUSTRIES LTD., Lod (IL)

(72) Inventor: Moshe Sabato, Yishuv Hashmonayim (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 0 days.

(21) Appl. No.: 16/961,355

(22) PCT Filed: Jan. 13, 2019

(86) PCT No.: PCT/IL2019/050051
§ 371 (c)(1),
(2) Date: Jul. 10, 2020

(87) PCT Pub. No.: WO2019/142181
PCT Pub. Date: Jul. 25, 2019

(65) Prior Publication Data
US 2020/0341493 A1    Oct. 29, 2020

(30) Foreign Application Priority Data
Jan. 18, 2018 (IL) .......................... 257010

(51) Int. Cl.
*G05D 1/10* (2006.01)
*G01S 13/90* (2006.01)
(Continued)

(52) U.S. Cl.
CPC ........... *G05D 1/106* (2019.05); *B64C 39/024* (2013.01); *G01S 13/904* (2019.05);
(Continued)

(58) Field of Classification Search
CPC ...... G05D 1/106; G05D 1/0016; H04N 7/185; G01S 13/904; G01S 13/867;
(Continued)

(56) References Cited

U.S. PATENT DOCUMENTS 3,153,784 A    10/1964   Thracy et al.
5,673,050 A *  9/1997   Moussally .......... G01S 13/0209
                                                         342/22
(Continued)

FOREIGN PATENT DOCUMENTS

KR    101415145 B1    7/2014
WO    2012028386 A1   3/2012
WO    2016107908 A1   7/2016

OTHER PUBLICATIONS

International Preliminary Report on Patentability for International Application No. PCT/IL2019/050051 completed Mar. 10, 2020.
(Continued)

*Primary Examiner* — Marthe Y Marc-Coleman
(74) *Attorney, Agent, or Firm* — Dorsey & Whitney LLP

(57) ABSTRACT

The presently disclosed subject matter includes a UAV surveillance system and method which enables quick and convenient activation of an on-board radar (e.g., in SAR or GMTI mode) without having predefined suitable flight instructions. It enables ad-hoc operation of radar data acquisition devices allowing to switch from EO data acquisition to radar data acquisition or activate a radar side-by-side with an EO sensing device.

20 Claims, 8 Drawing Sheets

(51) Int. Cl.
*B64C 39/02* (2006.01)
*G05D 1/00* (2006.01)
*H04N 7/18* (2006.01)
*G01S 13/86* (2006.01)

(52) U.S. Cl.
CPC ........... *G05D 1/0016* (2013.01); *H04N 7/185* (2013.01); *B64C 2201/127* (2013.01); *B64C 2201/141* (2013.01); *B64C 2201/146* (2013.01); *G01S 13/867* (2013.01); *G01S 13/9056* (2019.05)

(58) Field of Classification Search
CPC ............... G01S 13/9056; B64C 39/024; B64C 2201/146; B64C 2201/141; B64C 2201/127
See application file for complete search history.

(56) References Cited

U.S. PATENT DOCUMENTS

| | | | |
|---|---|---|---|
| 9,121,669 B1* | 9/2015 | Hyslop | F41G 7/2293 |
| 2007/0040121 A1 | 2/2007 | Kalayeh | |
| 2010/0253567 A1 | 10/2010 | Factor et al. | |
| 2011/0006944 A1* | 1/2011 | Goldman | G01S 13/9029 342/25 A |
| 2012/0127028 A1 | 5/2012 | Bamler et al. | |
| 2016/0019458 A1 | 1/2016 | Kaufhold | |
| 2020/0096630 A1* | 3/2020 | Fox | G01S 13/9056 |

OTHER PUBLICATIONS

International Search Report and Written Opinion from International Application No. PCT/IL2019/050051 dated Apr. 15, 2019.

\* cited by examiner

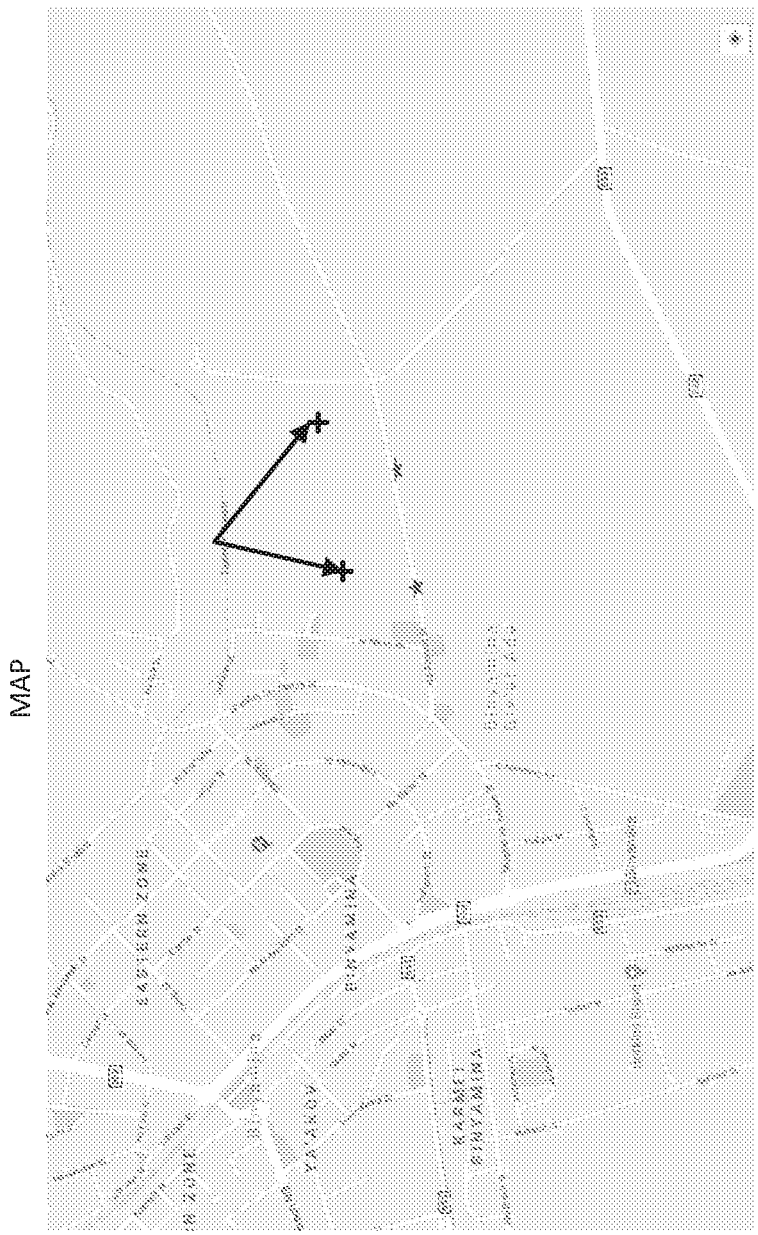

AUTOMATIC CAMERA DRIVEN AIRCRAFT CONTROL FOR RADAR ACTIVATION

FIELD OF THE PRESENTLY DISCLOSED SUBJECT MATTER

The presently disclosed subject matter relates to the field of airborne data acquisition systems.

BACKGROUND

Unmanned aerial vehicles (also known as UAVs, drones, remotely piloted aircrafts (RPA) or remotely piloted aircraft systems (RPAS)) are sometimes utilized as an airborne system for surveillance and remote observation and tracking of objects. To this end, UAVs are equipped with a sensing sub-system comprising some type of data acquisition device (e.g., electro optic imagining devices (cameras), radar, etc.). The data acquisition device is used for surveying a scene and collecting sensed-data and generating images of the surveyed scene.

The generated sensed-data and/or images can be transmitted, over a communication link, to a control unit where the images are displayed on a display device to be viewed by an operator. The control unit enables to provide user input which includes for example, different types of commands, such as lock and track command, zoom-in command, centering command, etc. The commands are executed at the sensing sub-system e.g., locking and tracking an object located in a surveyed scene.

One type of radar which can be used in an airborne data sensing sub-system is synthetic-aperture radar (SAR). SAR installed on-board an airborne platform, such as a UAV, provides images of a surveyed area. Operation of the SAR is based on signal processing algorithms that allow to combine data of successive radar transmission echoes while utilizing the motion of the platform between these transmissions. This process forms a synthetic antenna aperture that allows the creation of higher-resolution images than would otherwise be possible with a given physical antenna. SAR high resolution output is independent of flight altitude or the weather and can operate both in the day and at night.

In SAR mode the radar scans an area of interest as the platform travels and changes it position relative to the area. For continuous scanning of an area, SAR is many times mounted on the platform pointing in a direction substantially perpendicular to the direction of flight (also known as "side looking airborne radar"). Normally, when operating in SAR mode, an airborne platform is flown along an area of interest while an on-board SAR scans the area on its sides.

Another type of radar mode of operation is ground moving target indication (GMTI). While SAR generates high resolution imagery of stationary objects, GMTI is focused on detection and geolocation of moving objects such as vehicles and personnel moving on the ground. In GMTI mode, Doppler modulations in the radar echoes are exploited to identify moving objects. GMTI is normally executed by a radar located at the front of the platform, operating in sweeping movements from side to side.

GENERAL DESCRIPTION

A UAV operating in SAR mode and/or GMTI mode is provided with specific instructions for navigating the UAV along a flight route that is selected to enable scanning of the desired area of interest in the desired mode. Such instructions can be provided for example, during flight by a UAV operator remotely controlling the UAV, or by a predetermined operational plan, uploaded to the UAV, and comprising flight instructions and radar activation instructions for obtaining the desired result. For example, a SAR operational plan can comprise flight instructions for directing the UAV along a predefined flight route (comprising a series of waypoint (coordinates) to be followed by the UAV) along the side of an area of interest to enable scanning the area with a side mounted SAR. Normally, whenever it is desired to activate SAR for collecting data over a certain area, a designated operational plan that includes the respective flight instructions is first generated and uploaded to the UAV, and then the SAR is activated while flying over the area according to the flight instructions.

In some cases, however, a need to activate SAR data acquisition arises in real-time without having a predefined operational plan ready for execution. This of course requires generating appropriate flight instructions ad-hoc. This process complicates SAR operation as it may be lengthy, delay initialization of SAR activation, and may also result in excessive resource consumption due to the additional flight time exhausted during preparation of the operational plan.

A need to switch to SAR data acquisition can emerge for example while operating an on-board electro optic data acquisition device. Different than SAR, electro optic data acquisition devices (e.g., any one of: color, black and white, and Infra-Red cameras, as well as Laser based scanning devices) have a limited ability to operate in bad weather. Electro optic data acquisition devices do not penetrate through clouds, and therefore provide poor results if the sky becomes cloudy. In the event of a sudden weather change, it would be advantageous to activate an on-board SAR directed to scan substantially the same area as the electro optic device and provide an alternative data source. However, as mentioned above, immediate ad-hoc activation of a SAR requires an operational plan which is not always available.

The presently disclosed subject matter includes a UAV surveillance system and method which enables quick and convenient activation of an on-board radar (e.g., in SAR or GMTI mode) without having predefined suitable flight instructions. It enables ad-hoc operation of radar data acquisition devices allowing to switch from EO data acquisition to radar data acquisition or activate a radar side-by-side with an EO sensing device.

According to an aspect of the presently disclosed subject matter there is provided a surveillance system comprising: a remote-control unit operatively connectable over a communication link to an aerial control unit mountable on an aircraft (e.g., a UAV) having autonomous flight capabilities; the aerial control unit comprising an electro-optic (EO) data acquisition device and a radar;

the EO data acquisition device is configured, while the UAV is airborne, to capture one or more images of a surveyed area and transmit the images to the control unit;

the remote control unit is configured to receive data identifying an area of interest in the one or more images, the area of interest selected to be scanned by the radar;

the surveillance system further comprising a processing circuitry configured, in response to the received data, to:

register the one or more images to a respective map of the area displayed in the one or more images;

identify a sub-area in the respective map corresponding to the area of interest identified in the images; and automatically generate a flight route for navigating the UAV over the area of interest while enabling operating the radar;

the aerial control unit is configured to:

execute flight instructions for autonomously controlling the aircraft's flight along the flight route, and activate the radar for acquiring radar data output over the area of interest.

According to certain examples of the presently disclosed subject matter the system may comprise the additional features (i-x) enumerated below in any technically possible combination and/or permutation.

i. The surveillance system, wherein the flight route is adapted to any one of desired radar operation modes including SAR operation mode and GMTI operation mode.

ii. The surveillance system, wherein the respective map is an orthophoto.

iii. The surveillance system, wherein the received data includes data indicative of a desired radar operation mode.

iv. The surveillance system, wherein the processing circuitry is integrated as part of the remote control unit and configured to transmit to the aerial control unit data indicative of the flight route.

v. The surveillance system wherein the processing circuitry is integrated as part of the aerial control unit, and the remote control unit is configured to transmit to the aerial control unit data indicative of the area of interest in the one or more images.

vi. The surveillance system, wherein the remote control unit includes a user interface having a display device for displaying the images and is configured to enable a user to provide the data identifying the area of interest.

vii. The surveillance system, wherein the data identifying the area of interest includes two or more points indicated by the user on the images displayed on the display device.

viii. The surveillance system, wherein the processing circuitry is configured to identify map coordinates in the respective map corresponding to the location of the data identifying the area of interest.

ix. The surveillance system, wherein the processing circuitry is configured to define the area of interest in the respective map based on the received data.

x. The surveillance system, wherein the aircraft is an unmanned aerial vehicle.

According to another aspect of the presently disclosed subject matter there is provided a remote control unit operable in a surveillance system; the surveillance system comprising an aerial control unit operatively connectable over a communication link to the remote control unit and mountable on an aircraft having autonomous flight capability; the aerial control unit comprising an electro-optic (EO) data acquisition device and a radar;

the remote control unit is configured to:

receive one or more images of a surveyed area captured by the EO data acquisition device while the aircraft is airborne; receive data indicative of an area of interest in the one or more images, the area of interest selected to be scanned by the radar; register the one or more images to a respective map of the area displayed in the one or more images; identify a sub-area in the respective map corresponding to the area of interest; and automatically generate a flight route for navigating the UAV over the area of interest while enabling operating the radar; transmit data indicative of the flight route to the aerial control unit, to thereby enable the aerial control unit to execute flight instructions for autonomously controlling the aircraft's flight along the flight route, and activate the radar for acquiring radar data output over the area of interest.

According to another aspect of the presently disclosed subject matter there is provided a method of operating a radar in a surveillance system, the surveillance system comprising: a remote control unit operatively connectable over a communication link to an aerial control unit mountable on an aircraft; the aerial control unit comprising an electro-optic (EO) data acquisition device and a radar;

the method comprising:

receiving, at the remote control unit, one or more images of a surveyed area captured by the EO data acquisition device while the aircraft is airborne;

receiving, at the remote control unit, data identifying an area of interest in the one or more images, the area of interest selected to be scanned by the radar; registering the one or more images to a respective map of the area displayed in the one or more images; identifying a sub-area in the respective map corresponding to the area of interest; and automatically generating a flight route for directing the UAV over the area of interest while enabling operating the radar; executing, at the aerial control unit, flight instructions for autonomously controlling the aircraft's flight along the flight route, and activating the radar for acquiring radar data output over the area of interest.

According to another aspect of the presently disclosed subject matter there is provided a computer-readable non-transitory memory device tangibly embodying a program of instructions executable by a processing circuitry operatively connected to a surveillance system for executing a method operating a radar in a surveillance system, the surveillance system comprising: a remote control unit operatively connectable over a communication link to an aerial control unit mountable on an aircraft; the aerial control unit comprising an electro-optic (EO) data acquisition device and a radar;

the method comprising:

receiving, at the remote control unit, one or more images of a surveyed area captured by the EO data acquisition device while the aircraft is airborne;

receiving, at the remote control unit, data identifying an area of interest in the one or more images, the area of interest selected to be scanned by the radar; registering the one or more images to a respective map of the area displayed in the one or more images; identifying a sub-area in the respective map corresponding to the area of interest; and automatically generating a flight route for directing the UAV over the area of interest while enabling operating the radar; executing, at the aerial control unit, flight instructions for autonomously controlling the aircraft's flight along the flight route, and activating the radar for acquiring radar data output over the area of interest.

According to another aspect of the presently disclosed subject matter there is provided a method of operating a radar in a surveillance system, the surveillance system comprising: an aerial control unit mountable on an aircraft; the aerial control unit comprising an electro-optic (EO) data acquisition device and a radar;

the method comprising:

generating, one or more images of a surveyed area captured by the EO data acquisition device while the aircraft is airborne;

receiving data identifying an area of interest in the one or more images, the area of interest selected to be scanned by the radar; registering the one or more images to a respective map of the area displayed in the one or more images; identifying a sub-area in the respective map corresponding to the area of interest indicated; and automatically generating a flight route for directing the UAV over the area of interest while enabling operating the radar; executing, at the aerial control unit, flight instructions for autonomously controlling the aircraft's flight along the flight route, and activating the radar for acquiring radar data output over the area of interest.

According to another aspect of the presently disclosed subject matter there is provided a UAV having autonomous flight capabilities and being operatively connected over a communication link with a remote control unit, the aerial control unit and remote control unit constituting a surveillance system; the aerial control unit comprising an electro-optic (EO) data acquisition device and a radar;

the EO data acquisition device is configured, while the UAV is airborne, to capture one or more images of a surveyed area and transmit the images to the control unit;

the remote control unit is configured to receive data identifying an area of interest in the one or more images, the area of interest selected to be scanned by the radar;

the surveillance system further comprising a processing circuitry configured, in response to the received data, to:

register the one or more images to a respective map of the area displayed in the one or more images;

identify a sub-area in the respective map corresponding to the area of interest identified in the images; and automatically generate a flight route for navigating the UAV over the area of interest while enabling operating the radar;

the aerial control unit is configured to:

execute flight instructions for autonomously controlling the aircraft's flight along the flight route, and activate the radar for acquiring radar data output over the area of interest.

The different aspects of the present disclosed subject matter as mentioned above can optionally comprise one or more of the features (i-x) mentioned above, in any technically possible combination or permutation mutatis mutandis.

BRIEF DESCRIPTION OF THE DRAWINGS

In order to understand the claimed subject matter and to see how it may be carried out in practice, various embodiments will now be described, by way of non-limiting example only, with reference to the accompanying drawings, in which:

FIG. 4b is an example of a map of the area shown in FIG. 4a;

FIG. 4c shows a map of the area shown in the orthophoto of FIG. 4b;

DETAILED DESCRIPTION

Unless specifically stated otherwise, as apparent from the following discussions, it is appreciated that throughout the specification discussions utilizing terms such as "receiving", "identifying", "generating", "executing", "activating" or the like, include actions and/or processes of a computerized device that manipulate and/or transform data into other data, said data represented as physical quantities, e.g. such as electronic quantities, and/or said data representing physical objects.

The terms "control unit", "remote control unit", "aerial control unit" or the like, should be expansively construed to include any kind of electronic device with data processing circuitry that comprises at least one computer processor (e.g. a central processing unit (CPU), a microprocessor, an Integrated Circuit (IC), firmware written for or ported to a specific processor such as a digital signal processor (DSP), a microcontroller, a field programmable gate array (FPGA), an application specific integrated circuit (ASIC), etc.) and is configured and operable to execute computer instructions (e.g. loaded on a computer memory operatively connected to the processor) as disclosed herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the claimed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the claimed subject matter will now occur to the reader.

Figure 3:
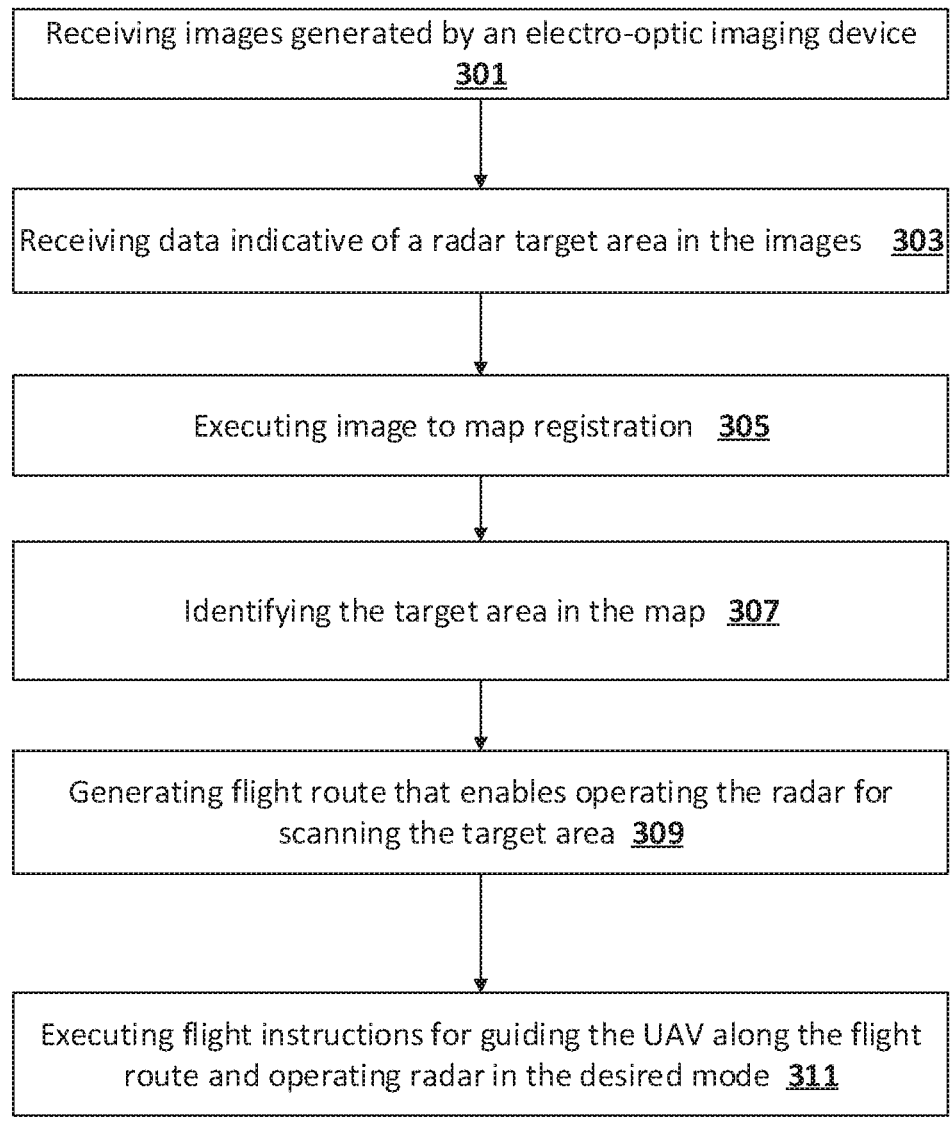
FIG. 3 is a flowchart of a sequence of operations carried out according to an example of the presently disclosed subject matter.

In embodiments of the claimed subject matter, fewer, more and/or different stages than those shown in FIG. 3 may be executed. In embodiments of the claimed subject matter one or more stages illustrated in FIG. 3 may be executed in a different order and/or one or more groups of stages may be executed simultaneously.

Figure 2:
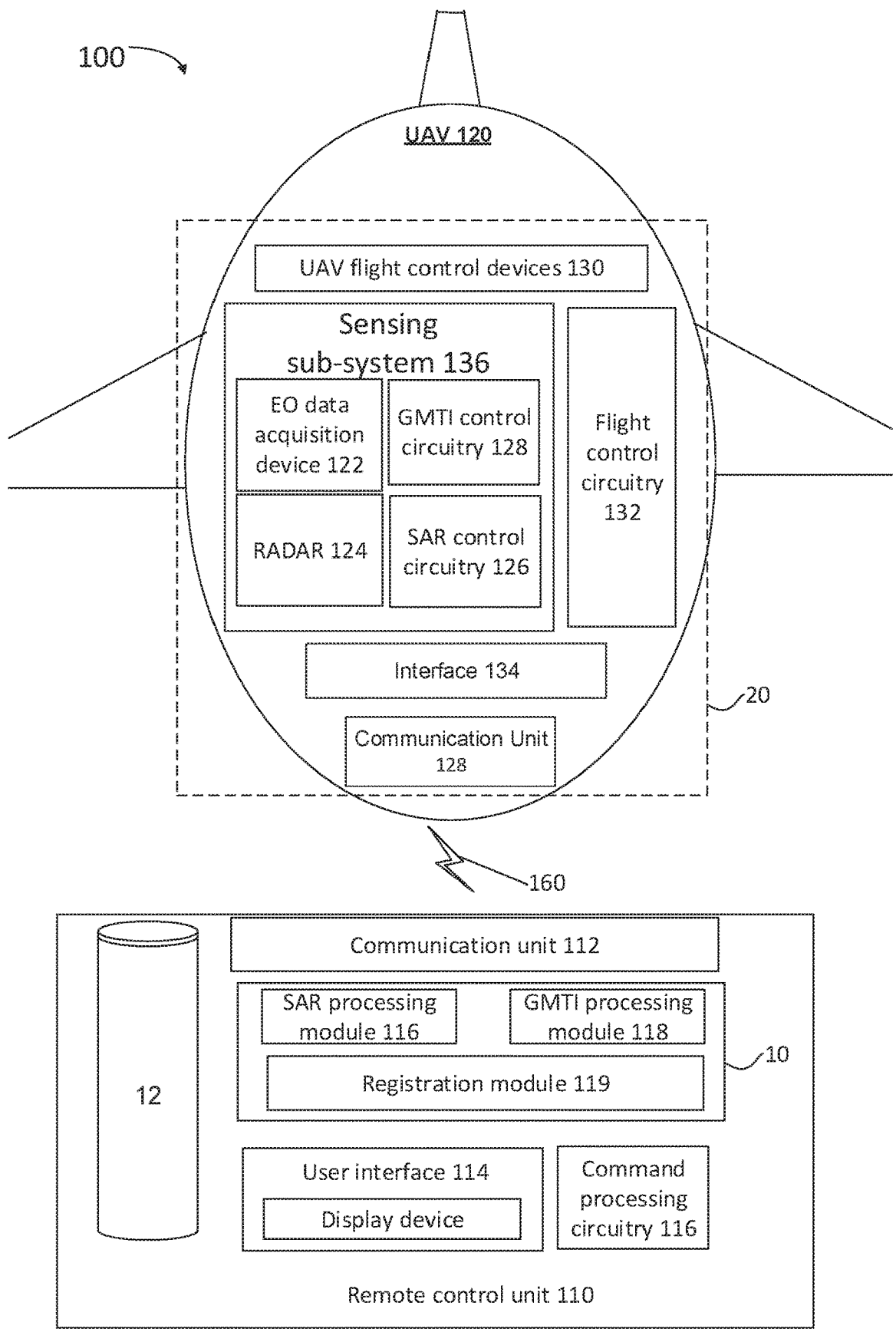
FIG. 2 is block diagram of a UAV-based surveillance system, according to an example of the presently disclosed subject matter.

FIG. 2 illustrates a schematic diagram of the system architecture in accordance with embodiments of the presently disclosed subject matter. Some elements in FIG. 2, such as those described with reference to control unit 110, may be centralized in one location or dispersed over more than one location. In other embodiments of the presently disclosed subject matter, the system may comprise fewer, more and/or different elements than those shown in FIG. 2. For example, while sensing acquisition sub-system in FIG. 2 is illustrated as a single unit, in other examples it can be designed as a distributed sub-system comprising for instance a separate EO data acquisition unit and a radar unit.

It is to be understood that when specific direction and/or angle values are given herein, they are meant to include a range of values acceptable within practical tolerances known in the pertinent field. Furthermore, for the sake of clarity, the term "substantially" is used herein to imply the possibility of variations in values within an acceptable range. According to one example, the term "substantially" used herein should be interpreted to imply possible variation of up to 15% over or under any specified value. According to another example, the term "substantially" used herein should be interpreted to imply possible variation of up to 10% over or under any specified value. According to yet another example, the term "substantially" used herein should be interpreted to imply possible variation of up to 5% over or under any specified value. According to a further example, the term "substantially" used herein should be interpreted to imply possible variation of up to 2.5% over or under any specified value. The specified value can be absolute value (e.g. substantially not exceeding 45°, substantially perpendicular, etc.) or relative (e.g. substantially not exceeding the height of x, etc.).

Figure 1:
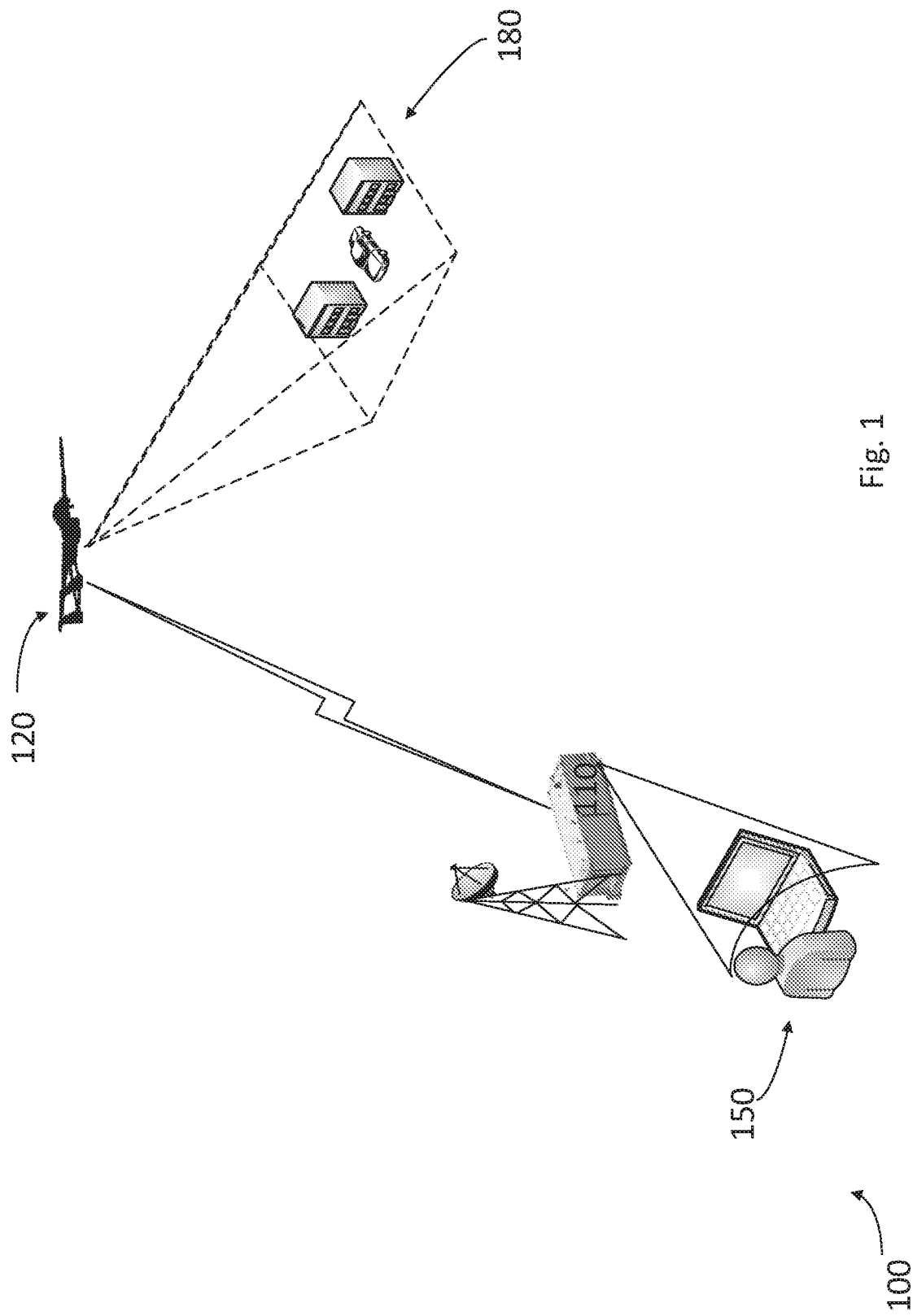
FIG. 1 is a high level illustration of a UAV-based surveillance system, according to an example of the presently disclosed subject matter.

Bearing the above in mind, attention is now drawn to FIG. 1 showing a schematic illustration of a surveillance system, according to an example of the presently disclosed subject matter. The illustration in FIG. 1 provides an example of a high level view of a UAV-based surveillance and tracking system 100. It is noted that while the description set forth herein mainly pertains to UAVs, this is done by way of a non-limiting example only and the principles disclosed with respect to UAVs can be similarly implemented in other types of aircrafts for example autonomous mode of a piloted aircraft configured with auto-pilot capabilities e.g. during SAR/GMTI activation.

Bearing the above in mind attention is drawn to FIG. 1 showing a schematic illustration of a UAV-based surveillance system 100 according to an example. System 100 comprises a control unit 110 (sometimes known as ground control unit (GCU)) located at one location and a UAV 120 carrying a sensing sub-system flying at another location. In the following description, control unit 110 is sometimes referred to as "remote control unit" in order to differentiate from aerial control unit 20 mounted on-board the UAV. FIG. 1 shows UAV 120 surveying area of interest (AOI) 180. The remote-control unit is configured to enable an operator to monitor and control the operation of the UAV. Control over UAV 120 can include both control over the operation of the UAV itself (e.g., flying instructions), as well as control over the operation of various payloads which are installed on the UAV. Operations performed by the UAV can be controlled by a human operator 150 or alternatively be partly or completely autonomous. Control system 110 can communicate with UAV 120 over a line of sight (LOS) and/or beyond line of sight (BLOS) communication link.

FIG. 2 is a block diagram of a UAV-based surveillance system 100 according to some examples of the presently disclosed subject matter. FIG. 2 shows remote control unit 110 connected over a communication link to an aerial control unit 20 on-board UAV 120. The aerial control unit 20 includes for example, sensing sub-system 136, flight control circuitry 132 operatively connected to flight control devices 130. Sensing sub-system 136 comprises data acquisition payloads including an electro optic (EO) acquisition device 122 and RADAR 124. The data acquisition payloads are used for surveying an area of interest, generating sensed-data and transmitting the sensed-data to remote control unit 110 over communication link 160. Sensed-data includes data that was acquired or generated by the data acquisition payloads (e.g., captured images of the surveyed area of interest, data characterizing identified objects in the captured images, etc.). In some examples radar 124 can be operated in a different operation mode, including SAR mode and GMTI mode. FIG. 2 shows by way of example, SAR control circuitry 126 configured in general to control operation of radar 124 in SAR mode. According to some non-limiting examples, SAR control circuitry 126 is configured to execute SAR operational instructions designated for controlling SAR operations while flying over an area of interest as explained below. Similarly, GMTI control circuitry 128 is configured to control the operation of radar in GMTI mode.

Flight control circuitry 132 is configured to control the flight of the UAV. According to some examples, flight control circuitry is configured to provide operational instructions for various UAV flight control devices 130 in order to direct the UAV along a desired flight path. As explained further below, the flight path can be for example a flight path designated for enabling data acquisition by an on-board radar e.g. in SAR mode or GMTI mode.

UAV flight control devices 130 include for example throttle, stabilizers, ailerons and rudders, configured for directing the UAV from its current position to a new desired position. Various control units (not shown) can be operatively connected to each respective flight control device dedicated for controlling its operation.

Aerial control unit 20 further comprises communication unit 128 for communicating with remote control unit 110. In some examples, aerial control unit 20 can further comprise interface 134 configured to distribute incoming commands to the designated units. For example, flight instructions are forwarded by interface 134 to flight control circuitry 132 and EO or radar activation instructions are forwarded by interface 134 to the relevant data acquisition device.

Sensed-data (e.g. captured images) is sent by aerial control unit 20 and received at remote control unit 110 to be displayed on a display device (e.g. one or more LED screens; shown by way of example as part of user interface 114) for viewing by operators. In some examples, sensing sub-system 120 can be further configured to locate and track a sighted object.

User interface 114 can comprise, in addition to one or more display devices, various input devices (e.g., touch-screen, mouse, joystick, etc.) to enable an operator to provide user-input such as commands. Command processing circuitry 116 is configured to process received user input and generate respective commands to be executed at the UAV including for example, commands providing instructions for directing the sensing sub-system to perform various operations. For example, user input includes control commands to a certain data acquisition device such as EO sensing device and radar. As mentioned above, commands include for example, lock and track commands, zoom commands, centering commands, etc. The sensing sub-system is configured to execute the received instructions and provide the control unit with the desired sensed-data.

According to certain examples of the presently disclosed subject matter, remote control unit 110 further comprises EO-to-radar processing circuitry 10. As explained in more detail below, EO-to-radar processing circuitry 10 is configured to automatically generate a radar operational plan for operating the radar in SAR mode or GMTI mode. The operational plan comprises flight instructions for controlling the UAV based on user input made on EO images captured by EO data acquisition device 122 and displayed by control unit 110. By way of example, EO-to-radar processing circuitry 10 comprises SAR processing module 116 for generating an operational plan for operating sensing sub-system 136 in SAR mode and GMTI processing module 118 for generating an operational plan for operating sensing sub-system in GMTI mode. A more detailed description of the functionality of EO-to-radar processing circuitry 10 is described below with reference to FIG. 3.

According to some examples, surveillance system 100 can be designed to comply with the requirements of STANAG 4586 which is the NATO specification for implementing a core UAV control system (CUCS, comprising both ground and aerial UAV control components). According to STANAG 4586, control system 110 comprises a client module (operator console) connected in sequence to the application servers unit, vehicle specific module and primary KOS ground data terminal.

The application servers unit comprises one or more computerized devices (e.g. computer servers) configured to enable the execution of various tasks. Each server is a computerized device with appropriate computer memory and one or more computer processors providing the required data processing capabilities.

The application servers unit can include by way of non-limiting example: flight control server configured for controlling the UAV's flight and various data acquisition servers operatively connected to a respective data acquisition device (e.g. camera, radar, communication intelligence device, etc.) installed on the UAV.

B/LOS GDT is configured to communicate with the UAV via a respective aerial data terminal (B/LOS ADT) which is part of the UAV onboard control system. Communication between GDT and ADT can be line of sight communication (LOS) or satellite based, beyond line of sight communication (B-LOS). Communication unit 112 can comprise or be otherwise operatively connected to a ground data terminal (B/LOS GDT) and communication unit 128 can comprise or be otherwise operatively connected to an aerial data terminal (B/LOS ADT).

FIG. 3 is a flowchart of a sequence of operations carried out according to some examples of the presently disclosed subject matter. Operations described with reference to FIG. 3, can be executed, for example, with the help of a surveillance system 100 configured according to the principles described above with reference to FIG. 2. It is noted however that any description of operations, which is made with reference to elements in FIG. 3, is done by way of example and for the purpose of illustration only and should not be construed as limiting in any way.

At block 301 one or more images of a surveyed scene which are generated by an airborne electro optic data acquisition device (e.g., 122 on-board UAV 120) are received at a control unit (e.g. 110). The received images are displayed on a display device to be viewed by an operator. In some examples, for the purpose of providing a continuous video feed of the surveyed scene, images are continuously captured and continuously transmitted, and displayed at the control unit.

In some cases, it may be desired to activate the radar (e.g. in SAR mode) together with an EO data acquisition device. In such a case, sensed-data generated by both types of data acquisition devices (e.g., EO and radar in SAR mode) is received at the control unit and can be displayed for example side-by-side. For instance, if the sky becomes cloudy, EO data acquisition can remain useful for at least part of the time or may become useful at a later time when the sky becomes clear again. SAR data output can be used to complement the EO data output and help in those instances where clouds obscure LOS of the EO data acquisition device. In other cases, it may be desired to activate SAR instead of an EO data acquisition device. For example, when the sky becomes very cloudy, for a long time, completely obstructing visibility of the EO data acquisition device.

At block 303 data input indicative of an area of interest to be scanned by a radar (e.g., in SAR mode or GMTI mode) is received at the control unit. Data input indicating a radar area of interest (also referred to herein as "radar target area") can be provided for example, by an operator of control unit 110. As mentioned above, according to the presently disclosed subject matter, control unit 110 comprises a user interface (114) enabling user interaction for indicating or selecting a radar target area. For this purpose, an operator can interact with images (e.g., video stream) generated by an airborne EO data acquisition device 122, which are displayed on a display device and mark on the displayed images a radar target area. For example, the operator can use a pointing device such as a computer mouse, touchpad or joystick for pointing and clicking on two or more points on a displayed image or video stream marking the area. Notably, the term "operator" (or "user") as used herein contemplates a human operator as well as a robotic operator (bot). For example, EO-to-radar processing circuitry 10 can comprise a dedicated computer program configured to automatically provide indications in displayed images of a radar target area based on predefined conditions. For example, the EO output images can be processed by a corresponding image processing circuitry, and if an area or an object in the images complies with predefined conditions (e.g., having size, shape, color, etc.), it can be automatically marked in the EO images to be further inspected by the radar. This option can provide a fully autonomous transition from image to radar.

Figure 4A:
FIG. 4a is an example of an image of an area generated by an electro optic imaging device.

FIG. 4a shows an aerial photograph of a certain area, captured by an EO data acquisition device onboard the UAV (e.g., an image from an EO video image output). FIG. 4a shows two crosses, each cross being indicative of a respective point marking a radar target area. Notably, user input for marking a radar target area can be different than the illustrated example and can include more points (e.g., three points, four points, etc.) or some other type of marking (e.g., a rectangle, circle or some other shape drawn around a target area).

Figure 4B:
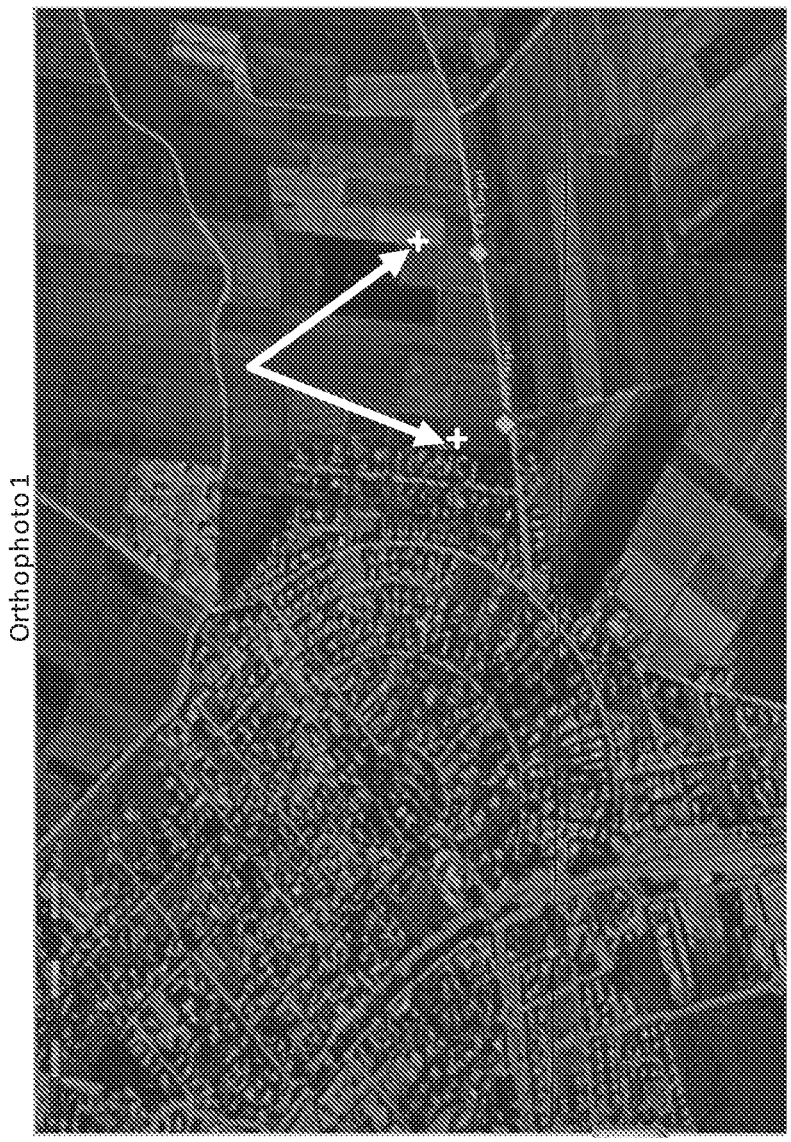

At block 305, an image to map (orthophoto) registration process is executed. In this process the displayed images (EO image output) with the radar target area indication and the orthophoto images of the same area are aligned to the same coordinate system. Registration can be executed for example by EO to registration module 119 in EO-to-radar processing circuitry 10. FIG. 4b is an orthophoto image (otherwise known as orthophoto map) of the same area shown in FIG. 4a. Similar to maps, orthophoto images, as shown in FIG. 4b, are characterized by uniform geometry and scale, and provide an accurate representation of the mapped area.

An orthophoto image of the area displayed in the images, can be retrieved for example from a data-repository 12 or from some other source such as a remote images/maps library. The appropriate orthophoto can be identified for example based on the global position of the UAV and the global position of the radar target area as known in the art.

At block 307, once registration between the images and the orthophoto is complete, the coordinates in the orthophoto image corresponding to the markings made on the EO image output are identified in the orthophoto (e.g., EO-to-radar processing circuitry 10) to thereby identify a sub-area in the orthophoto corresponding to the area of interest identified in the EO images. FIG. 4*b* shows two crosses, each cross being indicative of a respective point corresponding to points (e.g. inputted by a user) in the EO image output, which were identified in the orthophoto by registering the orthophoto (shown in FIG. 4*b*) with the image (shown in FIG. 4*a*).

Remote control unit 110 can be further configured to define a radar target area in the orthophoto based on the user input markings made in the images. This can be accomplished for example by an appropriate processing circuitry, e.g., SAR processing circuitry 116 when operating in SAR mode and GMTI processing circuitry 118 when operating in GMTI mode. For example, in case a target area is marked by points inputted in the images, control unit 110 can be configured to define an area surrounding the marked points. For example, if two points are used to mark a SAR target area, a rectangle can be defined based on the two points, wherein the rectangle sides are defined according to the distance between the points e.g., the two marked points define one side of a square having four equal sides, each side defined based on the distance between the marked points. If more points are used to mark the SAR target area, an area surrounding all points can be defined as the SAR target area. In other examples, if a shape (e.g., rectangle or circle) was drawn in the images to mark the target area, the shape can be copied from the images to the map based on the image to map (orthophoto) registration output.

At block 309 an operational plan is automatically generated. The operational plan includes a flight route that enables scanning of the target area by the radar in the desired mode. The flight route can be defined by a series of waypoints (map coordinates). As explained above, SAR is a side looking airborne radar which scans an area substantially perpendicular to the direction of flight. Accordingly, given the SAR target area in the map, a flight route is generated (e.g., by SAR processing circuitry 116) that enables SAR to scan the target area. The operational plan can further include activation instructions for activating the SAR along the flight route.

As mentioned above, the presently disclosed subject matter contemplates automatic EO driven UAV control for radar activation in different radar activation modes including, SAR mode and GMTI mode. When GMTI mode is activated, the operations described above with reference to block 309 are adapted to GMTI operation. According to one example, radar operation in GMTI mode includes moving a radar located at the front of the UAV (e.g., UAV nose) from side to side, to horizontally scan at a certain scanning angle, and then moving the radar vertically, to conduct another horizontal scan at a different height. Accordingly, the operational plan includes flight instructions for leading the UAV along a flight route that enables scanning of the target area from the front side of the UAV.

FIG. 4*c* shows a map of the area shown in the orthophoto of FIG. 4*b*. As known in the art, an orthophoto can be aligned (overlaid) with a map of the same area, and thus a map and a corresponding orthophoto are considered herein as equivalents. Accordingly, in some examples some processing can be performed on a drawn map rather than the orthophoto. For example, generation of the flight route as described below can be done on a corresponding drawn map rather than the orthophoto.

Figure 5:
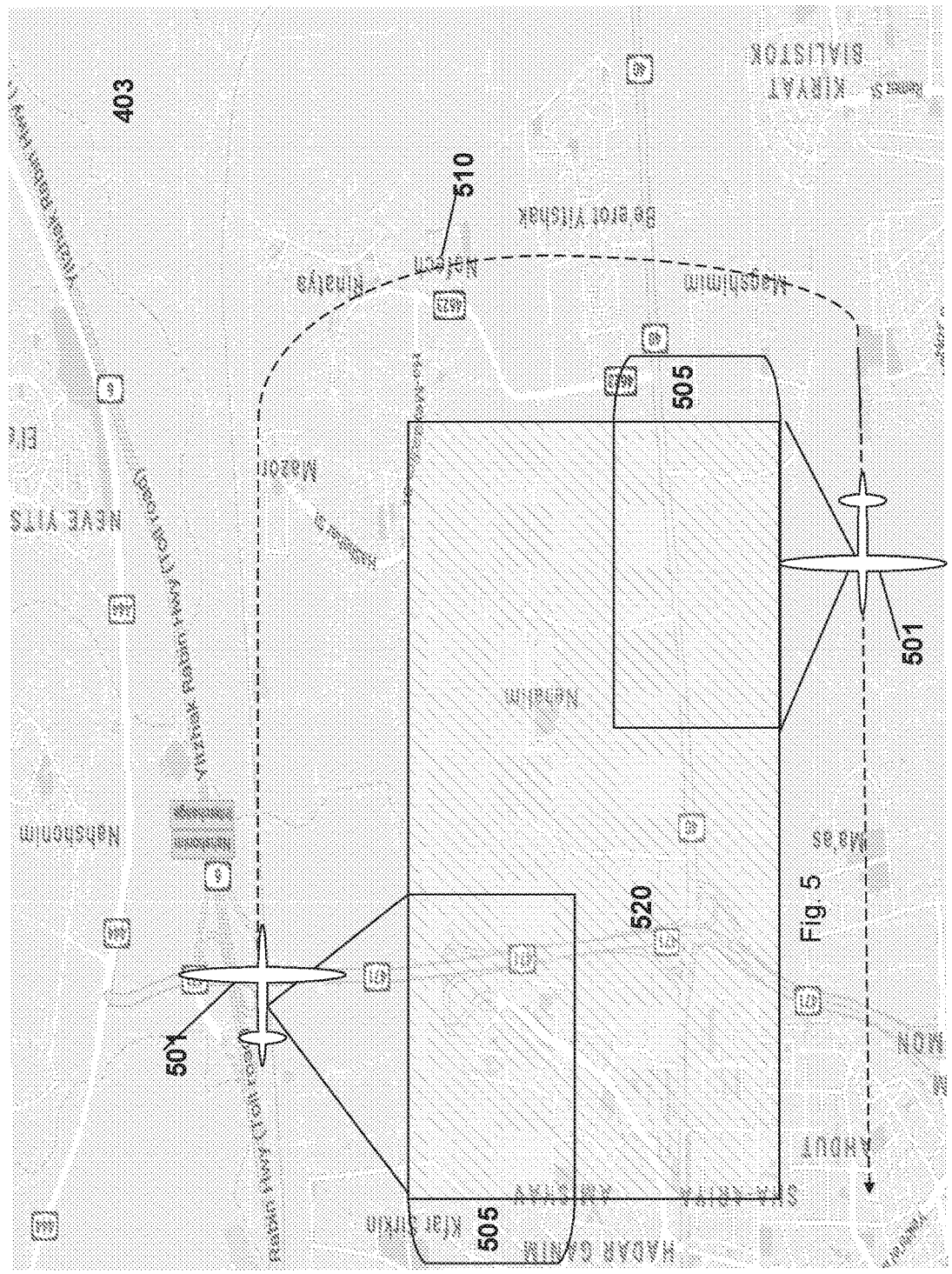
FIG. 5 is a schematic illustration in top view demonstrating SAR mode flight route, according to an example of the presently disclosed subject matter.
Figure 6:
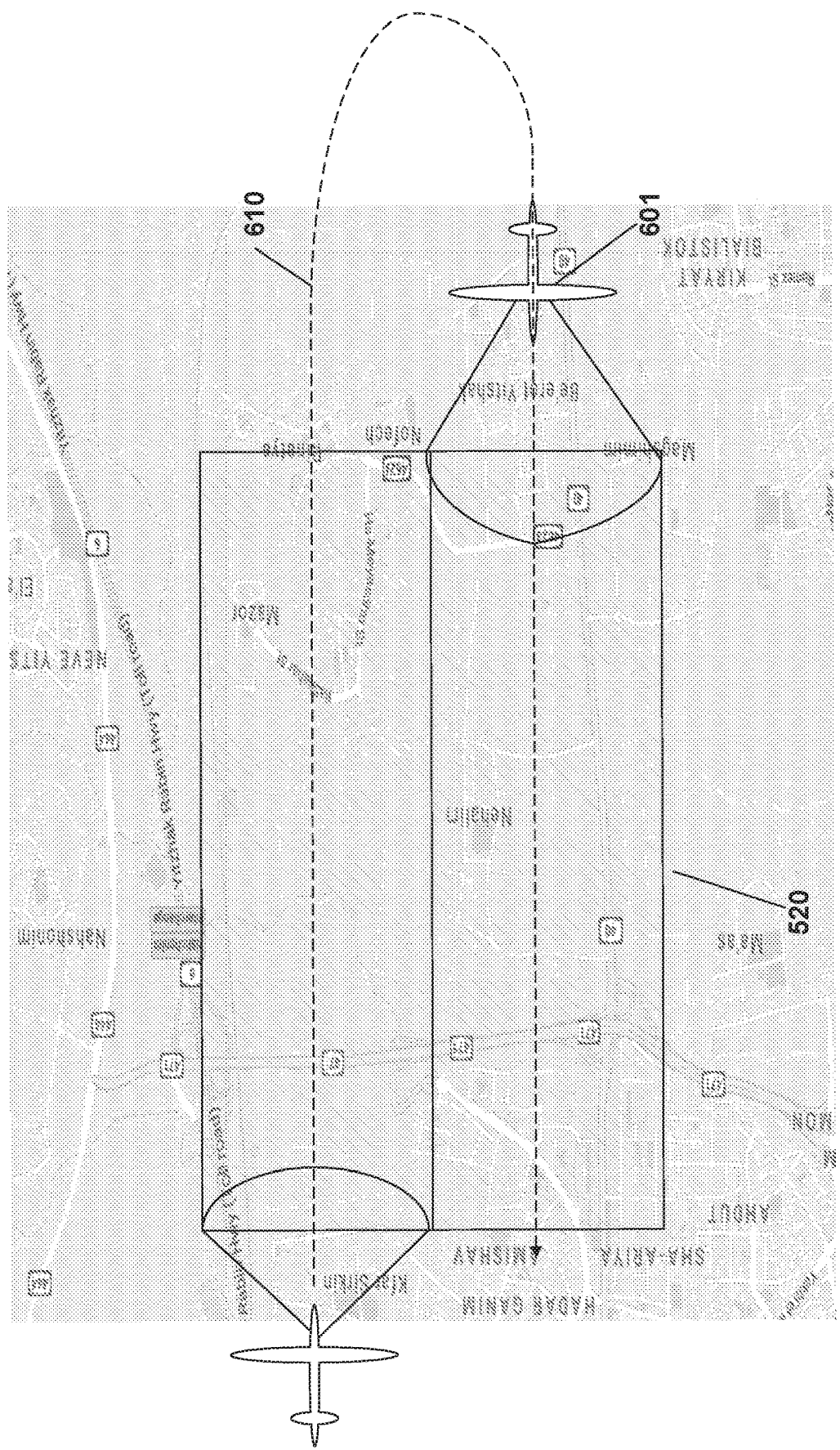
FIG. 6 is a schematic illustration in top view demonstrating GMTI mode flight route, according to an example of the presently disclosed subject matter.

FIGS. 5 and 6 demonstrate flight routes designated for SAR and GMTI modes, respectively. FIG. 5 is a schematic illustration in top view of an SAR operation mode flight route, in accordance with some examples of the presently disclosed subject matter. FIG. 5 shows a simplified example of a flight route 510, autonomously generated in real-time on an orthophoto or map based on input made on EO images, and which identifies a radar target area 520. The flight route enables scanning of target area 520 in SAR mode. In this particular example, the route surrounds the target area to enable the side view required for SAR operation. The scanning range 505 of the SAR covers half of the target area 520 and accordingly two passes over the target area are needed in order to scan the entire target area.

FIG. 6 is a schematic illustration in top view of a GMTI operation mode flight route, in accordance with some examples of the presently disclosed subject matter. FIG. 6 shows a simplified example of a flight route 610, autonomously generated in real-time on an orthophoto or map based on input made on EO images, and which identifies a radar target area 520. The flight route enables scanning of target area 520 in GMTI mode. In this particular example, the route includes two passes over the target area, where, in each pass, part of the target area is scanned by radar located at the front of the UAV. Thus, once the target area is known it is possible to automatically generate a flight route for scanning the target area with a radar in a desired operational mode.

Once available, the operational plan is executed by the UAV to enable autonomous flight of the UAV along the flight route (block 311). During execution the UAV is flown according to the flight instructions along the flight route that enables activation of the radar in the desired operation mode. Flight instructions for following the flight route can be generated and executed by flight control circuitry 132. For example, control circuitry 132 can be configured to generate specific instructions to various on-board flight devices 130 for leading the UAV along the route. The radar is activated to obtain the desired radar output. Radar activation can be controlled for example by an appropriate processing circuitry according to the desired operation mode. Radar output is transmitted back to control unit 110 and displayed on a displayed device. According to some examples, images captured by the EO data acquisition device can be displayed side-by-side to radar output (e.g., in two adjacent display devices) to enable an operator to watch both types of data simultaneously.

According to some system designs, the UAV can be an off-the-shelf (OTS) device configured inter alia, to fly according to a pre-programmed flight route and activate a radar while flying. In the present case the flight route is generated according to the operational requirements of a desired radar operation mode (e.g., SAR mode or GMTI mode). In case an OTS UAV is used, the specific modifications made to the surveillance system to enable the automatic generation of the flight route according to indications made with respect to an EO image as described above, can be implemented at the remote-control unit in order to avoid the need to alter the OTS UAV.

In some alternative system designs some functionalities described above as assigned to remote control unit 110 can be assigned to the aerial control unit 20. For example, information indicative of the area of interest received at the control unit can be transmitted to aerial control unit 20 where the operations described above with reference to blocks 305 to 311 can be executed, or when indication of an area of interest is generated automatically by a computer, in which case almost all functionally of the system is executed by the aerial control unit 20. To this end, aerial control unit 20 can comprise an aerial EO-to-radar processing circuitry having similar functionalities to those of EO-to-radar processing circuitry 10, including image to map registration and flight route generation capabilities.

In further alternative system designs, functionalities of the surveillance system can be distributed between the remote-control unit and the aerial control unit. For example, images to map registration can be performed at the remote-control unit 110 and generation of the flight route at the aerial control unit 120.

It is noted that while the presently disclosed subject matter predominantly refers to unmanned aerial vehicles, this is done by way of example, and other types of autonomous vehicles are contemplated as well, for example, a piloted aircraft having autonomous flight capabilities (e.g., auto-pilot), as well as other types of autonomous vehicles, such as ground and marine unmanned vehicles.

The presently disclosed subject matter contemplates a computer program implemented on a non-transitory computer useable medium being readable by a computer for executing the method of the presently disclosed subject matter. The presently disclosed subject matter further contemplates a computer-readable non-transitory computer memory tangibly embodying a program of instructions executable by the computer for executing the method of the presently disclosed subject matter.

The term "non-transitory" is used herein to exclude transitory, propagating signals, but to otherwise include any volatile or non-volatile computer memory technology suitable to the application.

It is to be understood that the presently disclosed subject matter is not limited in its application to the details set forth in the description contained herein or illustrated in the drawings. The presently disclosed subject matter is capable of other embodiments and of being practiced and carried out in various ways.

Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. A surveillance system, comprising:
a remote control unit operatively connectible over a communication network with an aerial control unit mountable on an aircraft having autonomous flight capabilities; the aerial control unit comprising an electro-optic (EO) data acquisition device and a radar;
the EO data acquisition device is configured, while the aircraft is airborne, to capture one or more images of a surveyed area and transmit the images to the remote control unit;
the remote control unit is configured to enable interaction of an operator in real-time with the one or more images captured by the EO data acquisition device for providing data identifying an area of interest in the one or more images, the area of interest selected to be scanned by the radar;
the surveillance system further comprising processing circuitry configured, in response to the data identifying an area of interest, to:
register the one or more images to a respective map of the area displayed in the one or more images;
identify a sub-area in the respective map corresponding to the area of interest identified in the images; and
automatically generate a flight route for navigating the aircraft over the area of interest while enabling operating the radar;
the aerial control unit is configured to:
execute flight instructions for autonomously controlling the aircraft along the flight route, and activate the radar for acquiring radar data output over the area of interest.

2. The surveillance system of claim 1, wherein the flight route is adapted to any one of desired radar operation modes including SAR operation mode and GMTI operation mode.

3. The surveillance system of claim 2, wherein data received from the remote control unit includes data indicative of a desired radar operation mode.

4. The surveillance system of claim 1, wherein the processing circuitry is integrated as part of the remote control unit and is configured to transmit to the aerial control unit, data indicative of the flight route.

5. The surveillance system of claim 1, wherein the processing circuitry is integrated as part of the aerial control unit, the remote control unit being configured to transmit to the aerial control unit, data indicative of the area of interest in the one or more images.

6. The surveillance system of claim 1, wherein the remote control unit comprises a user interface that includes a display device for displaying the one or more images and configured to enable an operator to interact with images to provide the data identifying the area of interest.

7. The surveillance system of claim 1, wherein the processing circuitry is configured to identify map coordinates in the respective map, the coordinates indicate a location of the area of interest.

8. The surveillance system of claim 1, wherein the processing circuitry is configured to define the area of interest in the respective map based on the received data.

9. A remote control unit operable in a surveillance system; the surveillance system comprising an aerial control unit operatively connectable over a communication link to the remote control unit and mountable on an aircraft having autonomous flight capability; the aerial control unit being further operatively connectable to an electro-optic (EO) data acquisition device and a radar mounted on the aircraft;
the remote control unit is configured, while the aircraft is airborne, to:
receive one or more images of a surveyed area captured by the EO data acquisition device while the aircraft is airborne;
enable interaction of an operator in real-time with the one or more images captured by the EO data acquisition device for providing data indicative of an area of interest in the one or more images, the area of interest selected to be scanned by the radar;
register the one or more images to a respective map of the area displayed in the one or more images;
identify a sub-area in the respective map corresponding to the area of interest indicated;
automatically generate a flight route for navigating the aircraft over the area of interest while enabling operating the radar, based on the data provided by the operator, interacting with the images; and
transmit data indicative of the flight route to the aerial control unit, to thereby enable the aerial control unit to execute flight instructions for autonomously controlling the aircraft's flight along the flight route, and activate the radar for acquiring radar data output over the area of interest.

10. The remote control unit of claim 9 further comprising a user interface that includes a display device for displaying the images and configured to enable an operator to provide the data identifying the area of interest.

11. A method of operating a radar in a surveillance system, the surveillance system comprising: a remote control unit operatively connected over a communication link to an aerial control unit mounted on an aircraft; the aerial control unit comprising an electro-optic (EO) data acquisition device and a radar;

the method comprising, while the aircraft is airborne:
  receiving, at the remote control unit, one or more images of a surveyed area captured by the EO data acquisition device while the aircraft is airborne;
  at the remote control unit, receiving data provided by an operator in real-time by interacting with the one or more images captured by the EO data acquisition device, the data comprising data identifying an area of interest in the one or more images, the area of interest selected to be scanned by the radar;
  registering the one or more images to a respective map of the area displayed in the one or more images;
  identifying a sub-area in the respective map corresponding to the area of interest indicated;
  automatically generating a flight route for directing the aircraft over the area of interest while enabling operating the radar; and
  executing, at the aerial control unit, flight instructions for autonomously controlling the aircraft along the flight route, and activating the radar for acquiring radar data output over the area of interest.

12. The method of claim 11 further comprising adapting the flight route to any one of desired radar operation modes including SAR operation mode and GMTI operation mode.

13. The method of claim 11, wherein the generating of the flight route is executed at the remote control unit, the method further comprising transmitting the flight route to the aerial control unit.

14. The method of claim 11, wherein the generating of the flight route is executed at the aerial control unit, the method further comprising transmitting data indicative of the area of interest in the one or more images to the aerial control unit.

15. The method of claim 11, further comprising displaying the one or more images on a display device and receiving the data identifying the area of interest in response to an interaction of the operator with the displayed images for indicating the area of interest, wherein the data includes two or more points pointed to by an operator on the images displayed on the display device.

16. The method of claim 11, further comprising identifying map coordinates in the respective map, the map coordinates indicate a location of data identifying the area of interest in the images.

17. The method of claim 11, further comprising defining the area of interest in the respective map based on the received data.

18. A method of operating a radar in a surveillance system comprising an aerial control unit mounted on an aircraft; the aerial control unit comprising an electro-optic (EO) data acquisition device and a radar;

the method comprising, while the aircraft is airborne:
  generating one or more images of a surveyed area captured by the EO data acquisition device while the aircraft is airborne;
  receiving data identifying an area of interest in the one or more images, the area of interest selected to be scanned by the radar; wherein the data is generated in real-time by an operator interacting with the one or more images captured by the EO data acquisition device for indicting the area of interest; registering the one or more images to a respective map of the area displayed in the one or more images; identifying a sub-area in the respective map corresponding to the area of interest indicated; and automatically generating a flight route for directing the aircraft over the area of interest while enabling operating the radar;
  executing, at the aerial control unit, flight instructions for autonomously controlling the aircraft along the flight route, and activating the radar for acquiring radar data output over the area of interest.

19. A computer-readable non-transitory memory device tangibly embodying a program of instructions executable by a processing circuitry operatively connected to a surveillance system for executing a method operating a radar in a surveillance system, the surveillance system comprising: a remote control unit operatively connectable over a communication link to an aerial control unit mountable on an aircraft; the aerial control unit comprising an electro-optic (EO) data acquisition device and a radar;

the method comprising, while the aircraft is airborne:
  receiving, at the remote control unit, one or more images of a surveyed area captured by the EO data acquisition device while the aircraft is airborne;
  receiving data provided by operator in real-time by interacting with the one or more images captured by the EO data acquisition device, the data comprising data identifying an area of interest in the one or more images, the area of interest selected to be scanned by the radar;
  registering the one or more images to a respective map of the area displayed in the one or more images;
  identifying a sub-area in the respective map corresponding to the area of interest indicated;
  automatically generating a flight route for directing the aircraft over the area of interest while enabling operating the radar; and
  executing, at the aerial control unit, flight instructions for autonomously controlling the aircraft along the flight route, and activating the radar for acquiring radar data output over the area of interest.

20. A method of autonomously adapting an aircraft flight path during transition between operation of an onboard electro-optic (EO) data acquisition device to an onboard radar, the method comprising, while the aircraft is flying autonomously:
  generating one or more images of a surveyed by the EO data acquisition device while the aircraft is airborne;
  receiving data generated by an operator by interacting with the one or more images captured by the EO data acquisition device identifying an area of interest in the one or more images, the area of interest selected to be scanned by the radar; registering the one or more images to a respective map of the area displayed in the one or more images; identifying a sub-area in the respective map corresponding to the area of interest indicated; and automatically generating a flight route for directing the aircraft over the area of interest while enabling operating the radar according to the sub-area identified in the map; executing, at the aircraft, flight instructions for autonomously controlling the aircraft's flight along the flight route, and activating the radar for acquiring radar data output over the area of interest.

* * * * *